(12) United States Patent
Kondo et al.

(10) Patent No.: US 10,322,673 B2
(45) Date of Patent: Jun. 18, 2019

(54) DRIVING ASSISTANCE DEVICE

(71) Applicant: TOYOTA JIDOSHA KABUSHIKI KAISHA, Toyota-shi (JP)

(72) Inventors: Toru Kondo, Toyoake (JP); Kazuki Sugie, Toyota (JP); Yoko Ishiguro, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 19 days.

(21) Appl. No.: 15/112,887

(22) PCT Filed: Dec. 26, 2014

(86) PCT No.: PCT/JP2014/084545
§ 371 (c)(1),
(2) Date: Jul. 20, 2016

(87) PCT Pub. No.: WO2015/111362
PCT Pub. Date: Jul. 30, 2015

(65) Prior Publication Data
US 2016/0339841 A1    Nov. 24, 2016

(30) Foreign Application Priority Data
Jan. 24, 2014  (JP) ................. 2014-011494

(51) Int. Cl.
*B60R 1/00* (2006.01)
*G02B 3/02* (2006.01)
(Continued)

(52) U.S. Cl.
CPC .................. *B60R 1/00* (2013.01); *G02B 3/02* (2013.01); *G02B 27/01* (2013.01); *G06T 5/006* (2013.01);
(Continued)

(58) Field of Classification Search
CPC .. B60R 1/00; G06T 5/00; G06T 5/006; H04N 5/225; H04N 7/18; H04N 7/183; H04N 5/2173
(Continued)

(56) References Cited

U.S. PATENT DOCUMENTS

2007/0081262 A1  4/2007  Oizumi et al.
2008/0151054 A1  6/2008  Kubota et al.
(Continued)

FOREIGN PATENT DOCUMENTS

CN   1353810 A      6/2002
JP   2008-236711 A  10/2008
(Continued)

OTHER PUBLICATIONS

International Search Report dated Mar. 31, 2015 in PCT/JP14/084545 Filed Dec. 26, 2014.
(Continued)

*Primary Examiner* — On S Mung
(74) *Attorney, Agent, or Firm* — Oblon, McClelland, Maier & Neustadt, L.L.P.

(57) ABSTRACT

A driving assistance device includes: an imaging unit; a projection unit that projects an image based on image information from the imaging unit toward a projection surface; and an adjustment unit that is configured to form image information that an image sensor of the imaging unit acquires to be adjusted image information that is adjusted for the projection surface, wherein the adjustment unit includes an optical correction structure that causes the image sensor to acquire the adjusted image information by optical correction.

9 Claims, 4 Drawing Sheets

(51) Int. Cl.
*G06T 5/00* (2006.01)
*H04N 7/18* (2006.01)
*G02B 27/01* (2006.01)
*H04N 5/217* (2011.01)
*H04N 5/225* (2006.01)

(52) U.S. Cl.
CPC ......... *H04N 5/2173* (2013.01); *H04N 5/2253* (2013.01); *H04N 7/183* (2013.01); *B60R 2300/202* (2013.01); *G02B 2027/0138* (2013.01); *G06T 2207/30252* (2013.01)

(58) Field of Classification Search
USPC ........................................................ 348/115
See application file for complete search history.

(56) References Cited

U.S. PATENT DOCUMENTS

| | | |
|---|---|---|
| 2008/0204557 A1 | 8/2008 | Kubota et al. |
| 2008/0239527 A1 | 10/2008 | Okabe et al. |
| 2008/0309764 A1 | 12/2008 | Kubota et al. |
| 2009/0086019 A1 | 4/2009 | Okabe et al. |
| 2010/0182492 A1 | 7/2010 | Choi |
| 2012/0188391 A1* | 7/2012 | Smith ................. H04N 5/2258 348/222.1 |
| 2014/0015997 A1 | 1/2014 | Baba |
| 2014/0340529 A1* | 11/2014 | Shibata ................. H04N 9/3185 348/189 |

FOREIGN PATENT DOCUMENTS

| | | | |
|---|---|---|---|
| JP | 2008-265719 A | | 11/2008 |
| JP | 2008-307982 A | | 12/2008 |
| JP | A-2009-021761 | | 1/2009 |
| JP | 2009-83764 A | | 4/2009 |
| JP | 2010-58742 A | | 3/2010 |
| JP | 2010-266528 A | | 11/2010 |
| JP | 2010266528 A | * | 11/2010 |
| JP | 2012-237966 A | | 12/2012 |

OTHER PUBLICATIONS

Office Acton issued in corresponding Chinese Patent Application No. 201480073878.6 dated Jun. 21, 2018 (with English translation) citing reference AO therein. (15 pgs.).

* cited by examiner

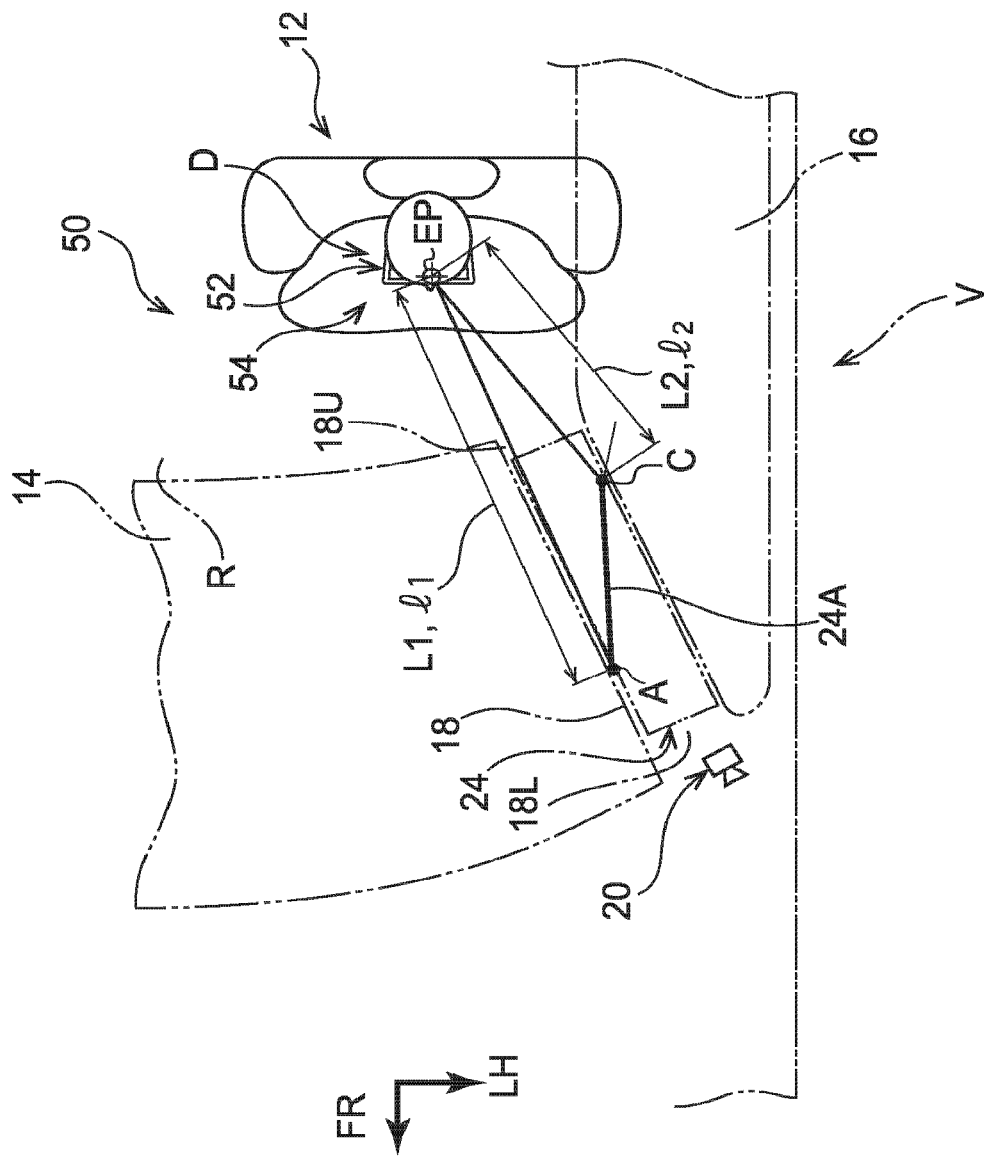

DRIVING ASSISTANCE DEVICE

TECHNICAL FIELD

The present invention relates to a driving assistance device.

BACKGROUND ART

A driving assistance method and driving assistance device are known (for example, see Japanese Patent Application Laid-Open (JP-A) No. 2008-265719) that, even if a blind spot is caused by a pillar when a driver is looking past a mirror at a vehicle's surroundings, may display an image of a blind spot region Ad at the pillar. This technology is constituted such that, in order to suppress warping of the image projected at the pillar, an image corrected by image processing is outputted to a projector.

SUMMARY OF INVENTION

Technical Problem

However, correction by image processing requires time for computation. Therefore, there is likely to be a large delay in the projection timing of a projected image relative to the actual scene.

An object of the present disclosure is to provide a driving assistance device with which a delay in a projection timing of an image projected at a projection surface relative to an actual scene may be kept small.

Solution to Problem

A driving assistance device according to a first aspect includes: an imaging unit; a projection unit that projects an image based on image information from the imaging unit toward a projection surface; and an adjustment unit that is configured to form image information that an image sensor of the imaging unit acquires to be adjusted image information that is adjusted for the projection surface.

In this driving assistance device, the image that is imaged by the imaging unit is projected at the projection surface by the projection unit, and the image projected by the projection unit is projected onto the projection surface. The image information acquired by the image sensor of the imaging unit is adjusted image information that has been adjusted to (the dimensions, shape, disposition and attitude of) the projection surface by the adjustment unit. Thus, an image in which warping at the projection surface and the like is corrected for may be projected without the image to be projected by the projecting unit being corrected by image processing.

Therefore, with the driving assistance device according to the first aspect, a delay in projection timing of the image projected at the projection surface relative to the actual scene may be kept small compared to a structure in which image information is corrected by image processing.

The above aspect may be a structure in which the adjustment unit includes an optical correction structure that causes the image sensor to acquire the adjusted image information by optical correction.

With this driving assistance device, because optically corrected image information is acquired at the image sensor of the imaging unit, the delay in projection timing of the image projected at the projection surface relative to the actual scene may be kept small with a simple structure.

The above aspect may be a structure in which the optical correction structure includes a sensor disposition structure in which the image sensor are disposed to be inclined with respect to an optical axis of the imaging unit or the image sensor are disposed to be curved.

In this driving assistance device, the image sensor is inclined with respect to the optical axis (direction) of the imaging unit or curved, in accordance with the dimensions and shape or disposition (attitude) of the projection surface. Therefore, the adjusted image information may be acquired at the image sensor with a simple structure.

The above aspect may be a structure in which the optical correction structure includes an optical member that refracts or reflects an image non-symmetrically with respect to an optical axis of the imaging unit.

In this driving assistance device, because the image is refracted or reflected non-symmetrically with respect to the optical axis by the optical member, an image that is non-symmetrical in accordance with the projection surface is focused at the image sensor and the image sensor acquires adjusted image information. Therefore, the adjusted image information may be acquired at the image sensor using an ordinary (flat) image sensor.

The above aspect may be a structure in which the optical correction structure is provided in the imaging unit.

In this driving assistance device, because the optical correction unit is provided inside the imaging unit (i.e., the optical correction unit configures the imaging unit), the overall structure is more compact than a structure in which a structure or member for correction is provided outside an imaging unit.

The above aspect may be a structure in which the adjustment unit includes a projection unit disposition structure that disposes the projection unit to match an eye point of a driver.

In this driving assistance device, (a light emission portion of) the projection unit is disposed to match the eye point of a driver by the projection unit disposition structure. Therefore, there is no need to correct for warping of the projected image that is caused by offsetting of the projection unit from the line of sight of the driver.

The above aspect may be a structure in which, in a plan view, the imaging unit is disposed on a line of extension of a line of sight from an eye point of a driver toward a vehicle member at which the projection surface is formed, and the imaging unit images a vehicle exterior region that constitutes a blind spot caused by the vehicle member.

In this driving assistance device, (at least a portion of) the vehicle exterior region that is a blind spot for the driver is imaged by the imaging unit, and the image imaged by the imaging unit is projected at the projection surface of the vehicle member that produces the blind spot. Because the imaging unit is disposed on the line of extension of the line of sight, a region that is a blind spot region for the driver may be imaged.

The above aspect may be a structure in which, in a plan view, an imaging direction of the imaging unit matches the direction of a line of sight from an eye point of a driver toward a vehicle member at which the projection surface is formed, and the imaging unit images a vehicle exterior region that constitutes a blind spot caused by the vehicle member.

In this driving assistance device, (at least a portion of) the vehicle exterior region that is a blind spot for the driver is imaged by the imaging unit, and the image imaged by the imaging unit is projected at the projection surface of the vehicle member that produces the blind spot. In this case, because the imaging direction according to the imaging unit matches the line of sight direction, warping of the projected image that is caused by an offset between the driver's line of sight direction and the imaging direction of the imaging unit can be kept small.

Effects of Invention

The driving assistance device according to the present disclosure as described above provides an excellent effect in that a delay in a projection timing of an image projected at a projection surface relative to an actual scene may be kept small.

BRIEF DESCRIPTION OF DRAWINGS

FIG. 4 is a plan view illustrating schematic overall structure of a visual information assistance device according to a second exemplary embodiment.

DESCRIPTION OF EMBODIMENTS

Figure 1B:
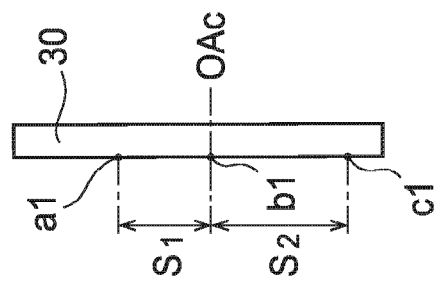
FIG. 1B is a conceptual diagram of adjusted image information, which is a diagram illustrating the CCD camera and optical correction structure that structure the visual information assistance device according to the first exemplary embodiment.
Figure 1A:
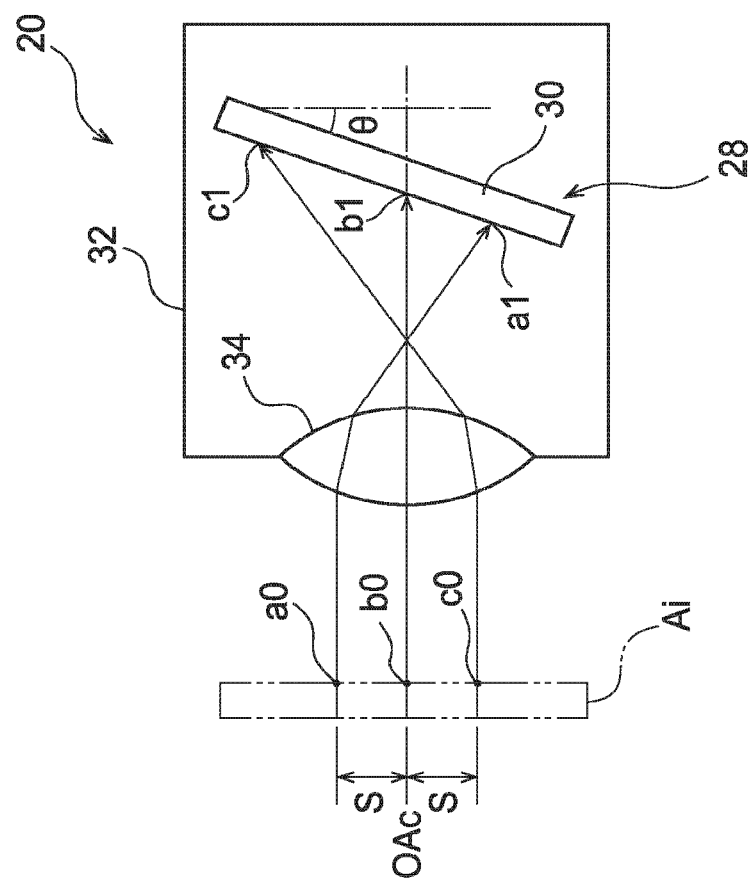
FIG. 1A is a schematic diagram illustrating schematic structure, which is a diagram illustrating a CCD camera and an optical correction structure that structure a visual information assistance device according to a first exemplary embodiment.
Figure 2:
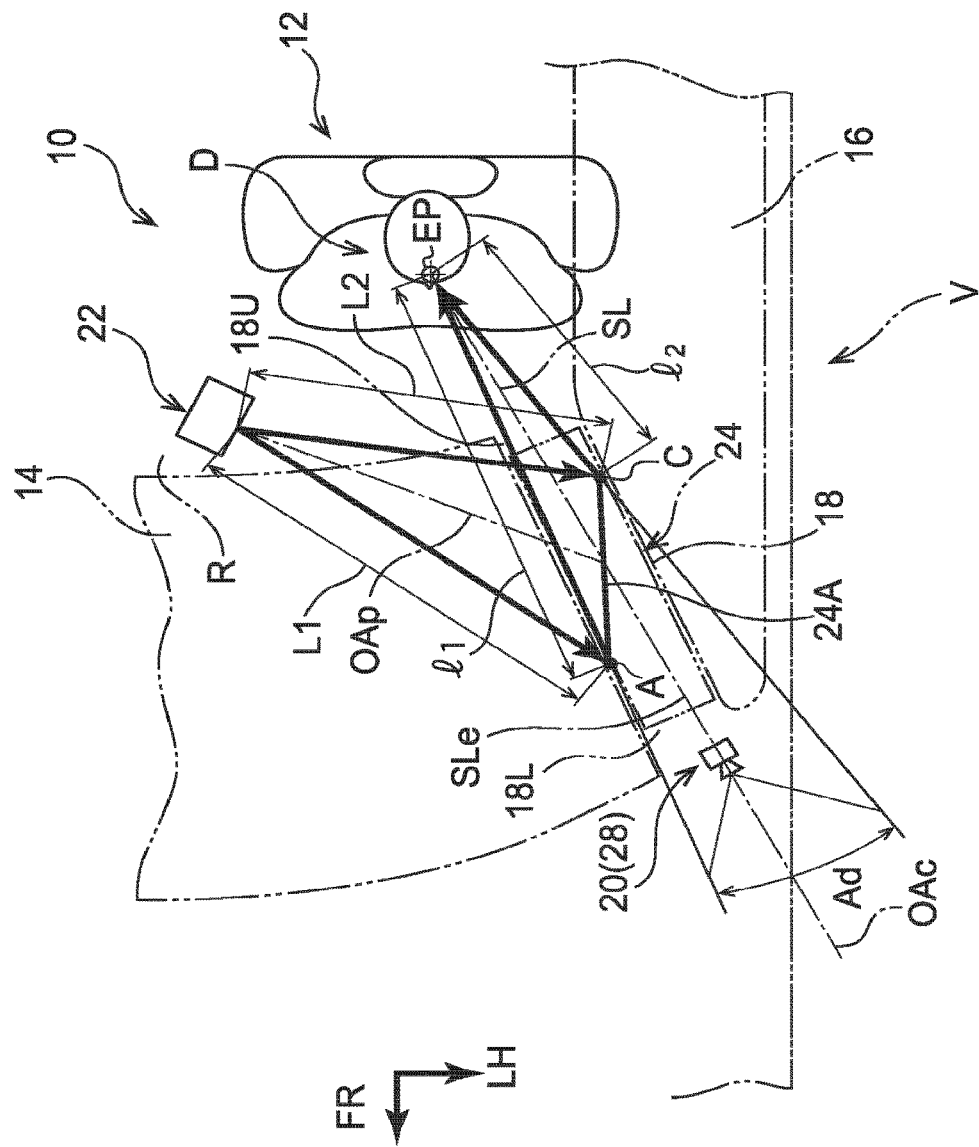
FIG. 2 is a plan view illustrating schematic overall structure of the visual information assistance device according to the first exemplary embodiment.

A visual information assistance device 10 that serves as an example of a driving assistance device according to a first exemplary embodiment of the present disclosure is described in accordance with FIG. 1A, FIG. 1B and FIG. 2. The arrow FR and arrow LH that are marked in FIG. 2 represent, respectively, the front direction of a vehicle in which the visual information assistance device 10 is employed and a left direction when facing in the front direction. In the following descriptions, where descriptions are given simply using the directions front, rear, up, down, left and right, unless otherwise specified, these represent the front and rear in the vehicle front-and-rear direction, up and down in the vehicle up-and-down direction, and left and right when facing in the front direction.

=Common Structures of the Automobile=

As illustrated in FIG. 2, a vehicle seat 12 is provided inside a cabin of an automobile V that serves as an example of a vehicle in which the visual information assistance device 10 is employed. In this exemplary embodiment, the vehicle seat 12 is disposed at the left side with respect to the vehicle width direction center of the automobile V. A windshield 14 is disposed in front of the vehicle seat 12. Side window glasses 16 are disposed at each of the vehicle width direction outer sides of the vehicle seat 12.

Between the windshield 14 and each side window glass 16, a front pillar 18 that serves as an example of a pillar is disposed. Together with a roof header and a cowl portion, the front pillar 18 structures a window frame that assures a field of view through the windshield 14. The front pillar 18 also structures, together with a door frame and the like of a respective side door that is not shown in the drawings, a window frame that assures a field of view through the side window glass 16. The front pillar 18 may be understood as being a framework (window frame) member that produces (causes) a blind spot for a seated occupant of the vehicle seat 12, who is a driver D.

=Visual Information Assistance Device=

The visual information assistance device 10 is structured to make visual information of a vehicle exterior region that constitutes a blind spot for the driver D because of the front pillar 18 (hereinafter referred to as "the blind spot region Ad") visible to the driver D. In the following descriptions, the term "the front pillar 18" refers to the framework member that is sandwiched between the windshield 14 and the side window glass 16; the term's meaning does not include a portion that is disposed lower than the windshield 14 and the side window glass 16. Concrete descriptions are given below.

As illustrated in FIG. 2, the visual information assistance device 10 includes a CCD camera 20, which serves as an example of an imaging unit, a projector 22, which serves as an example of a projection unit, and a screen 24, which forms a display surface. The CCD camera 20, projector 22 and screen 24 that are illustrated in the example in FIG. 2 are for projecting a blind spot image according to the left side front pillar 18 onto the left side front pillar 18.

—CCD Camera—

The CCD camera 20 is structured to image a vehicle exterior region (a vehicle outside scene) corresponding to the front pillar 18 and output image information obtained by the imaging to the projector 22. In a plan view, the CCD camera 20 is disposed on a line of extension SLe of a line of sight SL from the driver D toward the front pillar 18.

The line of sight SL is a straight line linking an eye point EP of the driver D with a width direction center of the front pillar 18 (the blind spot region Ad). The eye point EP is, for example, a standard eye point specified in the JIS D0021 standard, specified as a central portion between the eyes of the driver D. In FIG. 2, the blind spot region Ad is illustrated for a particular cross section of the front pillar 18 (a cross section 24A of the screen 24, which is described below).

A line extending the line of sight SL to the vehicle outer side, that is, in front of the front pillar 18, is the line of extension SLe of the line of sight SL. The front pillar 18 forms a framework member with a closed cross section, and the CCD camera 20 is disposed in this closed cross section.

An imaging (optical axis) direction of the CCD camera 20 matches the direction of the line of sight SL of the driver D in plan view. In a side view of the CCD camera 20, the imaging direction is a horizontal direction or a direction slightly downward. Specifically, the imaging direction of the CCD camera 20 in side view is a horizontal direction linking the eye point EP of the driver D with an up-and-down direction center of the front pillar 18 (i.e., of the blind spot region Ad). As an example, the CCD camera 20 may be disposed at an up-and-down direction central portion of the front pillar 18 and the imaging direction of the CCD camera 20 may coincide with the line of extension SLe of the line of sight SL of the driver D. An imaging range (field of view) of the CCD camera 20 is specified to be larger than the blind spot region Ad.

Internal structures of the CCD camera 20 that constitute an adjustment unit of the present disclosure are described below.

—Projector—

The projector 22 inputs image information from the CCD camera 20 by wireless or by wire and projects an image based on the image information toward the screen 24, which serves as an example of a projection surface. More specifically, of an image imaged by the CCD camera 20, the projector 22 is configured to project an image of the blind spot region Ad caused by the front pillar 18 toward the screen 24.

In this exemplary embodiment, the projector 22 is disposed at a front end side of a roof R (in a roof head lining, in an overhead console, or the like).

—Screen—

The screen 24 is provided at a surface of a pillar garnish (not shown in the drawings), which is an example of an interior fitting, that structures the front pillar 18, which serves as an example of a vehicle member. Alternatively, the screen 24 is formed integrally with the surface of the pillar garnish (being structured by the surface of the pillar garnish itself). The image projected by the projector 22 is projected onto the screen 24 and the screen 24 makes the image visible to the driver D.

In this exemplary embodiment, the screen 24 reaches from a vicinity of an upper end 18U of the front pillar 18 (the pillar garnish) to a vicinity of a lower end 18L. That is, the screen 24 is formed such that the image projected by the projector 22 is projected over substantially the whole surface of a range of the pillar garnish (the front pillar 18) that is visible to the driver D.

In this exemplary embodiment, the screen 24 is substantially flat and warping of the image due to the shape (curvature) of the screen 24 is suppressed. Adjusted image information that has been corrected for warping (described below) is inputted to the projector 22 such that warping of the image that has been caused by the disposition (attitude) of the projector 22 relative to the screen 24 is corrected for, and the image is projected on the basis of this image information.

—Adjustment Unit—

The visual information assistance device 10 is equipped with an optical correction structure 28, which serves as an example of an image adjustment unit and an optical correction structure. The optical correction structure 28 is structured such that image information acquired by an image sensor (a CCD device package) 30 that structures the CCD camera 20 is adjusted image information that has been adjusted for the dimensions, shape and disposition of the screen 24 relative to the driver D and the projector 22. Concrete descriptions are given below.

FIG. 1A illustrates schematic structure of the CCD camera 20 in a schematic diagram. As illustrated in this drawing, the CCD camera 20 includes a casing 32 that accommodates the image sensor 30 and a lens 34 that is retained in the casing 32 and focuses an image of an imaging range onto the image sensor 30. Although not shown in the drawing, the lens 34 is structured as a lens group in which plural lenses are combined. The image sensor 30 is structured to acquire image information corresponding to the focused image and output the image information to the projector 22.

In this case, the optical correction structure 28 is structured as a sensor disposition structure that disposes the image sensor 30 to be inclined relative to an optical axis OAc of the CCD camera 20 (the lens 34). An inclination angle θ of the image sensor 30 according to this sensor disposition structure (in the present exemplary embodiment, an inclination angle relative to a plane perpendicular to the optical axis OAc) is specified as follows.

First, to describe a presumed structure, a distance from the projector 22 to an arbitrary position A of the screen 24 (in FIG. 2, the cross section 24A) is represented by L1, and a distance from the projector 22 to another position C of the screen 24 is represented by L2. A distance from position A of the screen 24 to the eye point EP is represented by d1, and a distance from position C of the screen 24 to the eye point EP is represented by d2. The another position C is a position that has point symmetry with position A about a point of intersection between an optical axis OAp of the projector 22 and the screen 24.

When a correction coefficient is represented by K, the information angle θ of the image sensor 30 is set such that a correction coefficient K satisfying the following mathematical expression (1) is obtained.

$$d1/L1 = K \times d2/L2 \tag{1}$$

Further, as illustrated in FIG. 1A and FIG. 1B specific positions of the imaged image at the CCD camera 20 (an imaging region Ai) are represented by a0 and c0, and a position of the optical axis OAc is represented by b0. Position a0 corresponds to a position in the imaged image that is to be projected onto position A of the screen 24, and position c0 corresponds to a position in the imaged image that is to be projected onto position C of the screen 24. Therefore, a distance between positions a0 and b0 and a distance between positions b0 and c0 are equal, both being represented by S.

As illustrated in FIG. 1A, because of the disposition structure of the optical correction structure 28, focusing positions at the image sensor 30 of the positions a0, b0 and c0 are a1, b1 and c1, and the image information acquired by the image sensor 30 is as illustrated in FIG. 1B. When the distance between positions a1 and b1 because of the above-mentioned setting of the inclination angle θ of the image sensor 30 is S1 and the distance between positions b1 and c1 is S2, then the correction coefficient K is expressed by the following expression.

$$K = S2/S1$$

The inclination angle θ of the image sensor 30 is set such that this correction coefficient K satisfies expression (1).

According to the above, in the optical correction structure 28, the image sensor 30 is structured to acquire adjusted image information by an optically corrected image being focused at the image sensor 30.

=Operation=

Now, operation of the first exemplary embodiment is described.

The driver D of the automobile V in which the visual information assistance device 10 is employed drives the vehicle V while checking for safety on the basis of visual information that is visible through the windshield 14 and the side window glasses 16.

The visual information assistance device 10 projects images imaged by the CCD camera 20 at the screen 24 from the projector 22, and the images are projected onto the screen 24. The images projected onto the screen 24 can be seen by the driver D. That is, visual information (outside scenes) of the blind spot region Ad caused by the front pillar 18 are displayed as images at the screen 24 that is provided at the front pillar 18. Thus, the driver D may see images compensating for the blind spot region Ad in directions that the driver D intends to check (the blind spot region Ad). Therefore, if, for example, there is a pedestrian or the like in the blind spot region Ad, the driver D may be aware of the pedestrian or the like.

This visual information assistance device 10 is structured such that the image information acquired by the image sensor 30 of the CCD camera 20 is adjusted image information that is adjusted for the dimensions, shape and disposition of the screen 24. In this exemplary embodiment, the image sensor 30 acquires the adjusted image information by an image that is optically corrected by the optical correction structure 28 being focused on the image sensor 30.

When the adjusted image information is outputted from the CCD camera 20 to the projector 22, the projector 22 projects an image based on the adjusted image information at the screen 24. Thus, an image in which there is no warping as seen by the driver D or warping is greatly inhibited is projected onto the screen 24.

Therefore, the visual information assistance device 10 does not need to generate a corrected image by image processing (computation) with an image processing section (program) that would be provided at the CCD camera 20, the projector 22, an external device or the like. Therefore, the visual information assistance device 10 may project blind spot images from the projector 22 at the screen 24 without requiring time for computation.

Thus, in the visual information assistance device 10 according to the first exemplary embodiment, a delay in the projection timing of an image projected at the screen 24 relative to an actual scene may be kept small compared to a structure in which adjusted image information is obtained by image processing. Hence, as well as there being little warping of the projected image itself for the driver D, a blind spot image may be visualized that has little incongruity due to a time lag (an offset between the actual scene and the projected image).

In the visual information assistance device 10, the optical correction structure 28 is configured by the image sensor 30 being inclined with respect to the optical axis OAc of the CCD camera 20. Thus, the adjusted image information may be acquired at the image sensor 30 by a simple structure.

Furthermore, because the optical correction structure 28 is provided in the CCD camera 20 (structuring the CCD camera 20), the overall configuration of the visual information assistance device 10 is compact compared to a configuration in which a structure or member for correction is provided outside the CCD camera 20. Moreover, because the visual information assistance device 10 is a configuration in which the adjusted image information is acquired at the image sensor 30, a number of components is small and the overall configuration is compact compared to a configuration in which, for example, an optical member for correction is disposed between the CCD camera 20 and the projector 22.

Because the CCD camera 20 is disposed on the line of extension SLe of the line of sight SL of the driver D, the blind spot region Ad for the driver D may be imaged by the CCD camera 20. Because the imaging direction of the CCD camera 20 (the optical axis OAc) matches the direction of the line of sight SL in plan view, warping of the projected image that is caused by an offset between the direction of the line of sight SL of the driver D and the imaging direction of the CCD camera 20 can be kept small. Therefore, a blind spot image with even less incongruity for the driver may be made visible, and there is no need to perform correction by image processing of warping of the image that would be caused by such an offset of the imaging direction.

VARIANT EXAMPLES

Now, variant examples of a first exemplary embodiment are described. Structures that are basically the same as structures according to the first exemplary embodiment are assigned the same reference symbols as the structures according to the first exemplary embodiment; these structures may not be described and may not be shown in the drawings.

First Variant Example

Figure 3A:
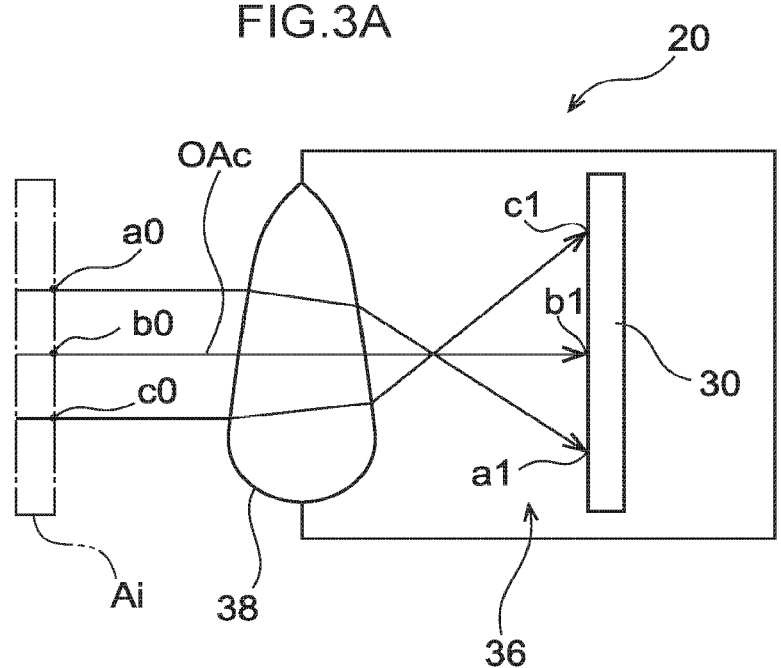
FIG. 3A is a schematic diagram illustrating a CCD camera and optical correction structure according to a first variant example.

FIG. 3A illustrates an optical correction structure 36 according to a first variant example, which is employed at the CCD camera 20 (the visual information assistance device 10), in a schematic diagram. As illustrated in this drawing, the optical correction structure 36 is a configuration that focuses the imaged image onto the image sensor 30 that is disposed orthogonally to the optical axis OAc of the CCD camera 20 with a correction lens 38. The correction lens 38 serves as an example of an optical member that transmits (refracts) the image non-symmetrically with respect to the optical axis OAc.

Although not shown in the drawing, the correction lens 38 is structured as a lens group in which plural lenses are combined. At least one of the lenses is constituted as a lens with different refractive indices at one side and another side of the optical axis OAc. The image information of an image focused onto the image sensor 30 is formed as adjusted image information that satisfies expression (1), similarly to the first exemplary embodiment.

Therefore, the same effects may be provided by the same operations as in the first exemplary embodiment by a structure that is provided with the optical correction structure 36 according to the first variant example instead of the optical correction structure 28.

Second Variant Example

Figure 3B:
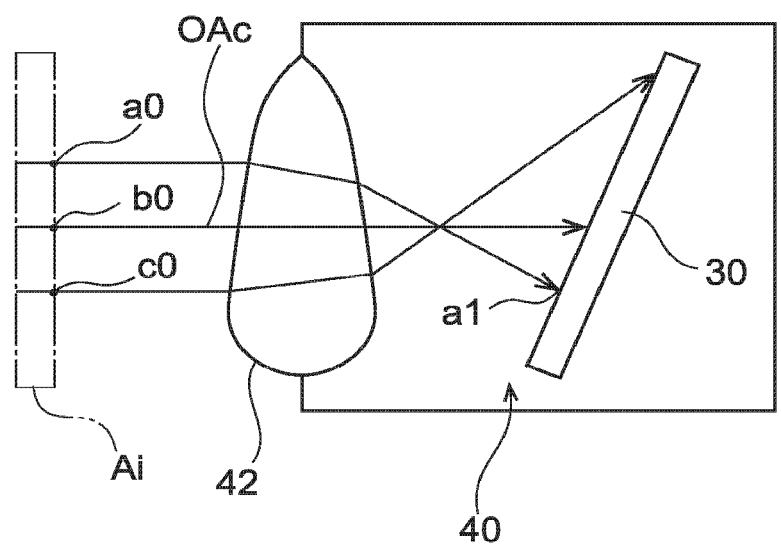
FIG. 3B is a schematic diagram illustrating a CCD camera and optical correction structure according to a second variant example.

FIG. 3B illustrates an optical correction structure 40 according to a second variant example, which is employed at the CCD camera 20 (the visual information assistance device 10), in a schematic diagram. As illustrated in this drawing, the optical correction structure 40 is a configuration that focuses the imaged image onto the image sensor 30 with a correction lens 42. The image sensor 30 is disposed at an angle to the optical axis OAc of the CCD camera 20. The correction lens 42 serves an example of the optical member that transmits (refracts) the image non-symmetrically with respect to the optical axis OAc.

Although not shown in the drawing, the correction lens 42 is structured as a lens group in which plural lenses are combined. At least one of the lenses is constituted as a lens with different refractive indices at one side and another side of the optical axis OAc. Thus, the image information of an image focused onto the image sensor 30 is adjusted image information that satisfies expression (1), similarly to the first exemplary embodiment.

Therefore, the same effects may be provided by the same operations as in the first exemplary embodiment by a structure that is provided with the optical correction structure 40 according to the second variant example instead of the optical correction structure 28.

In the first exemplary embodiment and variant examples described above, examples are illustrated in which the image sensor 30 is flat, but the present disclosure is not limited thus. For example, in a structure in which some or all of the screen 24 that is the projection screen forms a curved shape, a structure is possible in which at least a portion of the image sensor 30 is curved in accordance with the curved shape of the screen 24 (and with differences in distance between portions of the screen and the eye point EP, or the like). As another example, a structure is possible in which a curved shape of the screen 24 is optically corrected for by curvature of the image sensor 30 and differences in distance between portions of the screen and the eye point EP are corrected for by the correction lens 38 or 42. In these variant examples, flexibility in regard to the shape of the pillar garnish is higher.

In the variant examples described above, examples are illustrated in which a correction lens is provided to serve as an optical member, but the present invention is not limited thus. For example, a structure is possible in which a mirror that serves as an example of the optical member is disposed between the lens 34 and the image sensor 30, and the mirror is inclined with respect to the optical axis OAc or is curved. Furthermore, the present disclosure is not limited to structures in which an optical member for correction is provided in the CCD camera 20. For example, a structure is possible in which a mirror that guides an image of the blind spot region Ad to the CCD camera 20 is inclined with respect to the optical axis OAc or is curved.

Second Exemplary Embodiment

A visual information assistance device 50 that serves as another example of the driving assistance device according to a second exemplary embodiment of the present disclosure is described in accordance with FIG. 4. Structures that are basically the same as structures according to the first exemplary embodiment are assigned the same reference symbols as the structures according to the first exemplary embodiment; these structures may not be described and may not be shown in the drawings.

As illustrated in FIG. 4, the visual information assistance device 50 is provided with a projector 52 instead of the projector 22. The visual information assistance device 50 is also provided with an adjustment structure 54, which serves as an example of the adjustment unit and a projection unit disposition structure. The adjustment structure 54 is disposed to match up a position of the projector 52 (a projection position) with the eye point EP of the driver D.

In this exemplary embodiment, the adjustment structure 54 is configured by the projector 52 being a spectacle-type projector that the driver D wears on their head for use. Because this correction structure is employed, warping of the projected image that is caused by offsetting between the eye point EP of the driver D and the projection position of the projector 52 can be eliminated or kept very small. In other words, $$d1/L1=d2/L2=1$$

and thus $$K=1.$$

Therefore, in the present exemplary embodiment, adjusted image information may be acquired at the image sensor 30, which is disposed orthogonally to the optical axis OAc of the CCD camera 20 and onto which the imaged image is focused by the lens 34, without use of the optical correction structure 28, 36 or 40.

Because the adjusted image information is acquired at the image sensor 30, apart from operational effects due to the use of the optical correction structure 28, 36 or 40, the visual information assistance device 50 according to the second exemplary embodiment may provide the same effects by the same operations as the visual information assistance device 10. In the present visual information assistance device 50, the CCD camera 20 with a usual structure may be used (being disposed orthogonally to the optical axis OAc and an imaged image being focused onto the image sensor 30 by the lens 34) and blind spot images that have little or no warping may be projected without recourse to image processing.

In the second exemplary embodiment, an example is illustrated in which no optical correction structure is used, but the present disclosure is not limited thus. For example, in a structure that projects blind spot images onto a screen 24 of which at least a portion is curved, an optical correction structure for correcting for this curvature may be employed (an optical member such as a lens or the like, a structure that causes the image sensor 30 to be curved, or the like).

In the exemplary embodiments described above, examples are illustrated in which the CCD camera 20 is used as the imaging unit, but the present disclosure is not limited thus; any kind of imaging unit may be used. Thus, for example, a CMOS camera or the like may be used instead of the CCD camera 20.

In the exemplary embodiments described above, structures are illustrated in which blind spot images according to the left side front pillar 18 are projected onto the left side front pillar 18, but the present disclosure is not limited thus. For example, a structure is possible in which blind spot images according to the right side front pillar 18 are projected onto the right side front pillar 18. As another example, a structure is possible in which blind spot images according to the left and right front pillars 18 are projected onto the respective left and right front pillars 18.

In the exemplary embodiments described above, examples are illustrated in which blind spot images according to the front pillar 18 are projected onto the front pillar 18, but the present disclosure is not limited thus. For example, a structure is possible in which blind spot images are projected onto a pillar, such as a center pillar, a rear pillar or the like, that produces a blind spot during reversing. In this case, the specific structure of each kind of adjustment unit (the optical correction structure 28, 36 or 40, the adjustment structure 54 or the like) is specified with reference to the eye point EP of the driver D in a state in which the driver D is turned to face backward.

In the exemplary embodiments described above, examples are illustrated in which blind spot images are projected at the screen 24 that is disposed at the member that forms the blind spot (the pillar garnish), but the present disclosure is not limited thus. A structure in which images are projected at a projection surface is sufficient. For example, a structure is possible in which images capturing a region at the vehicle rear during reversing or images capturing a situation at a rear seat are projected at an instrument panel or the like.

It will be clear that the present disclosure may be embodied with numerous modifications within a scope that does not depart from the spirit of the present disclosure.

The disclosure of Japanese Patent Application No. 2014-011494 filed Jan. 24, 2014 is incorporated into the present specification by reference in their entirety.

Correspondences between the reference symbols used in the present specification and the names of elements are shown below.

10 Visual information assistance device (an example of the driving assistance device)
18 Front pillar (an example of the vehicle member)
20 CCD camera (an example of the imaging unit)
22 Projector (an example of the projection unit)
24 Screen (an example of the projection surface)

28 Optical correction structure (an example of the adjustment unit, an example of the optical correction unit, and an example of the sensor disposition structure)
30 Image sensor
36, 40 Optical correction structure 36, 40 (an example of the adjustment unit and an example of the optical correction unit)
38, 42 Correction lens (an example of the optical member)
50 Visual information assistance device
52 Projector (an example of the projection unit)
54 Adjustment structure (an example of the adjustment unit and an example of the projection unit disposition structure)

The invention claimed is:

1. A driving assistance device comprising:
an imaging unit disposed at an outer side of a front pillar of a vehicle;
a projector disposed inside the vehicle and configured to project an image based on image information acquired from the imaging unit toward a projection surface disposed at an inner side of the front pillar; and
an optical correction structure that is configured to cause an image sensor of the imaging unit to acquire adjusted image information that is adjusted for the projection surface by optical correction, the optical correction performed by disposing the image sensor inclined by an angle θ relative to a plane perpendicular to an optical axis of the imaging unit, the angle θ being determined in advance based on a distance between the projector and the projection surface.

2. The driving assistance device according to claim 1, wherein the optical correction structure includes a sensor disposition structure in which the image sensor is disposed to be curved.

3. The driving assistance device according to claim 1, wherein the optical correction structure includes an optical member that refracts or reflects an image non-symmetrically with respect to an optical axis of the imaging unit.

4. The driving assistance device according to claim 1, wherein the optical correction structure is provided in the imaging unit.

5. The driving assistance device according to claim 1, wherein,
in a plan view, the imaging unit is disposed on a line of extension of a line of sight from an eye point of a driver toward a vehicle member at which the projection surface is formed, and
the imaging unit images a vehicle exterior region that constitutes a blind spot caused by the vehicle member.

6. The driving assistance device according to claim 1, wherein,
in a plan view, an imaging direction of the imaging unit matches the direction of a line of sight from an eye point of a driver toward a vehicle member at which the projection surface is formed, and
the imaging unit images a vehicle exterior region that constitutes a blind spot caused by the vehicle member.

7. The driving assistance device according to claim 1, wherein the optical correction structure is configured to cause the adjusted image information to be formed at or before a time when the adjusted image information is acquired by the image sensor.

8. The driving assistance device according to claim 1, wherein the adjusted image information is adjusted for the projection surface without correction by image processing.

9. The driving assistance device according to claim 1, wherein a correction coefficient K of the optical correction is defined by:

$$K = S2/S1$$

and the angle θ is set such that the correction coefficient K is satisfying:

$$d1/L1 = K \times d2/L2,$$

where L1 is a distance from the projector to a position A of the projection surface, L2 is a distance from the projector to another position C of the projection surface, d1 is a distance from position A of the projection surface to an eye point EP of an occupant of the vehicle, and d2 is a distance from position C of the projection surface to the eye point EP, and
where S1 is a distance between positions a1 and b1, S2 is a distance between positions b1 and c1, where b1 is a position where the optical axis of the imaging unit intersects the image sensor, a1 is a focusing position of an image at the image sensor to be projected on position A, and c1 is a focusing position of the image at the image sensor to be projected on position C.

* * * * *